(12) United States Patent
Park

(10) Patent No.: US 11,396,331 B2
(45) Date of Patent: Jul. 26, 2022

(54) FRONT END STRUCTURE FOR VEHICLE

(71) Applicants: HYUNDAI MOTOR COMPANY, Seoul (KR); KIA MOTORS CORPORATION, Seoul (KR)

(72) Inventor: Ji Woong Park, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/034,977

(22) Filed: Sep. 28, 2020

(65) Prior Publication Data
US 2021/0347413 A1 Nov. 11, 2021

(30) Foreign Application Priority Data
May 11, 2020 (KR) .................. 10-2020-0055996

(51) Int. Cl.
| | | |
|---|---|---|
| *B62D 25/08* | (2006.01) | |
| *B62D 21/15* | (2006.01) | |
| *B60R 19/24* | (2006.01) | |

(52) U.S. Cl.
CPC ......... *B62D 25/085* (2013.01); *B62D 21/152* (2013.01); *B60R 19/24* (2013.01)

(58) Field of Classification Search
CPC ............... B62D 21/152; B62D 25/085; B60R 2021/0023; B60R 19/34
USPC ..... 296/193.09, 187.1, 203.02; 293/102, 133
See application file for complete search history.

(56) References Cited

U.S. PATENT DOCUMENTS

| | | | | |
|---|---|---|---|---|
| 8,720,961 B2* | 5/2014 | Han | ........................... | F16F 7/12 |
| | | | | 293/133 |
| 8,733,823 B2* | 5/2014 | Brockhoff | ............... | B60R 19/34 |
| | | | | 296/187.1 |
| 8,888,168 B2* | 11/2014 | Kuwabara | ............ | B62D 25/082 |
| | | | | 296/187.09 |
| 9,045,100 B2* | 6/2015 | Kaneko | .................... | B60R 19/34 |
| 9,180,828 B2* | 11/2015 | Sakakibara | ............. | B60R 19/34 |
| 9,233,715 B1* | 1/2016 | Ramoutar | ............ | B62D 21/152 |
| 9,315,167 B1* | 4/2016 | Hardy | .................. | B62D 25/082 |
| 9,421,927 B2* | 8/2016 | Basappa | .............. | B62D 21/152 |
| 9,527,463 B2* | 12/2016 | Ramoutar | ............... | B60R 19/04 |
| 9,539,966 B2* | 1/2017 | Kato | ....................... | B60R 19/04 |
| 9,561,824 B2* | 2/2017 | Tamaoki | ................ | B62D 21/02 |
| 9,567,010 B2* | 2/2017 | Volz | ................... | B62D 25/2081 |
| 9,669,785 B2* | 6/2017 | Holmstrom | ........... | B60R 19/023 |
| 9,676,416 B2* | 6/2017 | Kitakata | .............. | B62D 21/152 |

(Continued)

FOREIGN PATENT DOCUMENTS

CN        110481477 A    * 11/2019

*Primary Examiner* — Jason S Morrow
*Assistant Examiner* — Wenwei Zhuo
(74) *Attorney, Agent, or Firm* — Lempia Summerfield Katz LLC

(57) ABSTRACT

A front end structure for a vehicle includes: a pair of front side members; a front bumper beam located in front of the pair of front side members; a pair of bumper beam extensions respectively extending from both ends of the front bumper beam toward both sides of the vehicle; and a pair of catching members attached to the pair of front side members, respectively. In particular, each bumper beam extension is curved toward the rear of the vehicle, and each catching member protrudes from a corresponding front side member toward the bumper beam extension.

9 Claims, 6 Drawing Sheets

(56) References Cited

U.S. PATENT DOCUMENTS

| | | | | |
|---|---|---|---|---|
| 9,771,106 | B2* | 9/2017 | Ogawa | B62D 25/082 |
| 9,956,991 | B1* | 5/2018 | Nishikawa | B62D 21/02 |
| 10,479,409 | B2* | 11/2019 | Fujiwara | B62D 21/155 |
| 10,526,017 | B2* | 1/2020 | Grattan | B62D 21/05 |
| 10,730,461 | B2* | 8/2020 | Yoshida | B60R 19/34 |
| 10,843,648 | B2* | 11/2020 | Zierer | B62D 21/152 |
| 10,850,773 | B2* | 12/2020 | Schneider | B62D 25/082 |
| 11,097,779 | B2* | 8/2021 | Baccouche | B62D 21/152 |
| 2014/0361560 | A1* | 12/2014 | Sakakibara | B60R 19/34 293/133 |
| 2021/0078637 | A1* | 3/2021 | Hammer | B62D 21/03 |

* cited by examiner

FRONT END STRUCTURE FOR VEHICLE

CROSS-REFERENCE TO RELATED APPLICATION

This application claims priority to and the benefit of Korean Patent Application No. 10-2020-0055996, filed on May 11, 2020, the entire contents of which are incorporated herein by reference.

FIELD

The present disclosure relates to a front end structure for a vehicle, and more particularly, to a front end structure for a vehicle to provide a continuous load path.

BACKGROUND

The statements in this section merely provide background information related to the present disclosure and may not constitute prior art.

Vehicles are being tested for crashworthiness in various situations such as frontal impacts, side impacts, rear impacts, roll-overs, etc. In recent years, small overlap tests that simulate small overlap frontal crashes against a rigid barrier have been introduced by the Insurance Institute for Highway Safety (IIHS). Such a small overlap test is designed to allow only a small portion of a test vehicle (25% of the total width of the vehicle) traveling at 40 MPH (64 KPS) to strike the barrier on the front of the driver's seat, which is the most severe test of the known crash tests.

Compared to internal combustion engine vehicles, eco-friendly vehicles, such as battery electric vehicles (BEVs), fuel cell electric vehicles (FCEVs), and hybrid electric vehicles (HEVs), include energy sources such as batteries and fuel cells having a relatively greater weight, which increase the overall weight thereof. In addition, the eco-friendly vehicle may be affected by impact energy which is increased as much as its increased weight, and thus the weight of a reinforcing structure of a vehicle body may increase, resulting in increased manufacturing cost, packaging, etc.

Meanwhile, when the vehicle and the barrier collide in the small overlap test, the rotation behavior or lateral displacement (or lateral behavior) of the vehicle occurs.

FIG. 1 illustrates a free body diagram of a rotation behavior of a vehicle in a small overlap test. In the small overlap test, a barrier 5 impacts a front bumper 2 of a vehicle 1, moves along a front side member 3 of the vehicle 1, and sequentially impacts a front pillar 4 and a tire (not shown) of the vehicle 1.

Expression 1 below is a moment equation applied to the vehicle 1 in the small overlap test.

$$\Sigma Mz = Fa(Ds + Da) = I\alpha \qquad \text{Expression 1}$$

Here, $\Sigma Mz$ is the moment around a Z axis (the height axis of the vehicle), and I is the mass moment of inertia, which is proportional to the mass and mass distribution of the vehicle. Since the weight of the eco-friendly vehicle is greater than that of the internal combustion engine vehicle, the mass moment of inertia may increase. In expression 1, "$\alpha$" is an angular acceleration, and "Fa" is a load generated when the barrier 5 impacts the front pillar 4. According to expression 1, "Fa" increases in proportion to an overlap amount "Da" between the front pillar 4 and the barrier 5. When the barrier 5 impacts the front bumper 2, the barrier 5 applies a relatively large load along a longitudinal direction of the vehicle 1, and a lateral load "Fy1" applied to the front bumper 2 of the vehicle 1 is relatively small. Since the overlap amount "Da" between the front pillar 4 and the barrier 5 increases, the moment around the Z axis relatively increases. That is, when the lateral load "Fy1" applied to the vehicle 1 is relatively small in the small overlap test, a rotation behavior "Mz" of the vehicle occurs significantly.

In the small overlap test, when the rotation behavior of the vehicle occurs as illustrated in FIG. 1, the rotation amount of the vehicle increases. To counteract this, the weight of a reinforcing structure of a door aperture adjacent to the front pillar may relatively increase, which may be more disadvantageous to the safety of occupants. That is, when the barrier 5 impacts the front pillar 4 of the vehicle, the overlap amount between the front pillar 4 and the barrier 5 increases, and as a result, the angular acceleration of the vehicle increases during the impact, so the moment around the Z axis increases. Thus, a rotation angle of the vehicle may be significantly increased compared to that of the internal combustion engine vehicle.

FIG. 2 illustrates a free body diagram of a lateral behavior of a vehicle in a small overlap test. In the small overlap test, the barrier 5 impacts the front bumper 2 of the vehicle 1, moves along the front side member 3 of the vehicle 1, and sequentially impacts the front pillar 4 and the tire (not shown) of the vehicle 1. In FIG. 2, the side of a front end portion of a front subframe 6 protrudes outward from the front side member 3. Since the barrier 5 strikes the protruded side of the front subframe 6 before impacting with the front pillar 4, a lateral load "$F_{y2}$" applied to the front subframe 6 may be larger than a lateral load "$F_{y1}$" applied to the front bumper 2. That is, as the side of the front end portion of the front subframe 6 protrudes outward, the relatively large lateral load "$F_{y2}$" is applied to the vehicle 1, which moves the vehicle 1 in the lateral direction. As the overlap amount Da between the front pillar 4 and the barrier 5 is reduced, the moment $\Sigma Mz$ around the Z axis may decrease. For example, when the overlap amount Da between the front pillar 4 and the barrier 5 is 0, the moment $\Sigma Mz$ around the Z axis may be close to 0 ($\Sigma Mz = Fa(Ds + Da) = I\alpha = 0$).

In FIGS. 1 and 2, "Ft" is a load generated when the barrier 5 impacts the tire (not shown), "Ds" is a lateral distance from the vehicle center to the front pillar 4, and "Dt" is an overlap amount between the tire and the barrier 5.

As set forth above, when the vehicle and the barrier collide in the small overlap test, the rotation amount of the vehicle decreases if the vehicle's lateral behavior occurs. The weight of the reinforcing structure of the door aperture adjacent to the front pillar may be relatively reduced, which may be advantageous to the safety of occupants.

Since the eco-friendly vehicle increases its weight due to the batteries, it may respond advantageously to the small overlap tests by suppressing the rotation of the vehicle and inducing the lateral behavior of the vehicle.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a front end structure for a vehicle, which is designed to suppress the rotation of the vehicle and induce the lateral behavior of the vehicle in a small overlap crash, thereby improving the safety of occupants.

According to an aspect of the present disclosure, a front end structure for a vehicle may include: a pair of front side members; a front bumper beam located in front of the pair of front side members; a pair of bumper beam extensions respectively extending from both ends of the front bumper beam toward both sides of the vehicle; and a pair of catching members spaced apart from the pair of bumper beam extensions toward the rear of the vehicle, respectively. Each bumper beam extension may be curved toward each catching member.

The front end structure may further include a joint pin penetrating the front side member and the catching member. The joint pin may have an end portion protruding toward a free end of the bumper beam extension.

The catching member may be attached to an outboard side surface of a front portion of the front side member so as to be adjacent to the bumper beam extension.

The catching member may have a catching recess which is open to a free end of the bumper beam extension, and the catching recess may have a shape compatible with a shape of the free end of the bumper beam extension.

The catching member may include a first catching wall and a second catching wall which define the catching recess. The first catching wall may face the side of the vehicle, and the second catching wall may face the front of the vehicle.

The first catching wall may be substantially parallel to an axis of the front side member, and the second catching wall may be substantially perpendicular to the first catching wall.

The catching member may include an attachment wall attached to the front side member, a front support wall extending from a front end of the attachment wall toward the side of the vehicle, a rear support wall extending from a rear end of the attachment wall toward the side of the vehicle, and a sidewall extending from the rear support wall toward the front of the vehicle.

The front support wall may connect the front end of the attachment wall and a front end of the first catching wall, the rear support wall may connect the rear end of the attachment wall and a rear end of the sidewall, and the sidewall may connect a front end of the rear support wall and the second catching wall.

The catching member may further include a first reinforcing rib connecting the attachment wall and the first catching wall, and a second reinforcing rib connecting the attachment wall and the rear support wall.

The front end structure may further include a front subframe disposed between the pair of front side members. The front subframe may include a front crossmember extending in a width direction of the vehicle, and the catching member may be located so that a load path may extend to the front crossmember through the catching member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
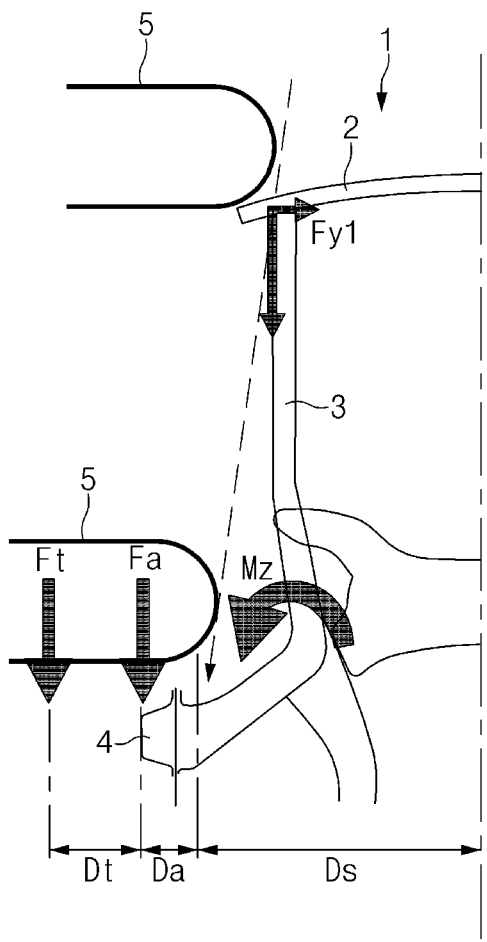
FIG. 1 illustrates a free body diagram of a rotation behavior of a vehicle in a small overlap test.
Figure 2:
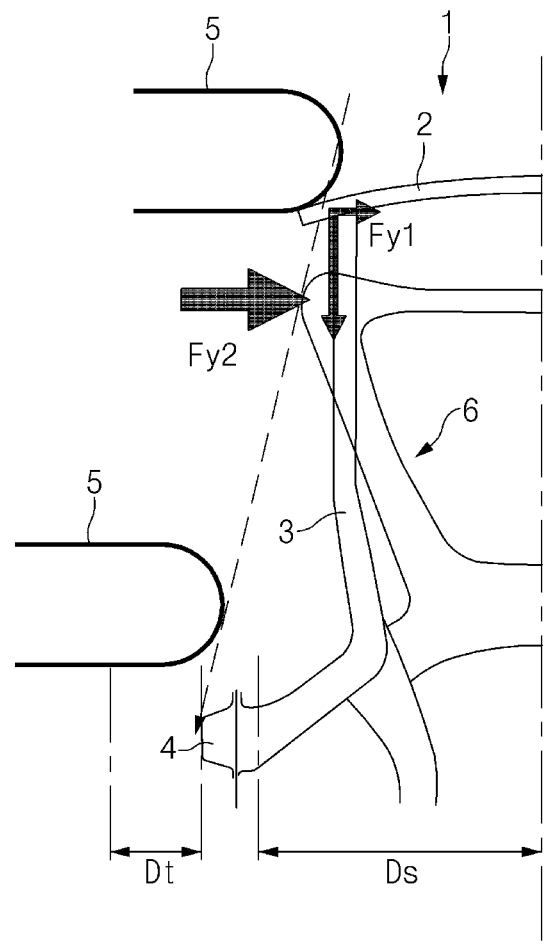
FIG. 2 illustrates a free body diagram of a lateral behavior of a vehicle in a small overlap test.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. For reference, the dimensions of elements, thicknesses of lines, and the like, illustrated in the drawings referred to in the description of exemplary forms of the present disclosure, may be exaggerated for convenience of understanding. Terms used for describing the present inventive concept have been defined in consideration of the functions of elements, and may be altered in accordance with the intention of a user or an operator, in view of practice, or the like. Therefore, the terms should be defined on the basis of the entirety of this specification.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 3:
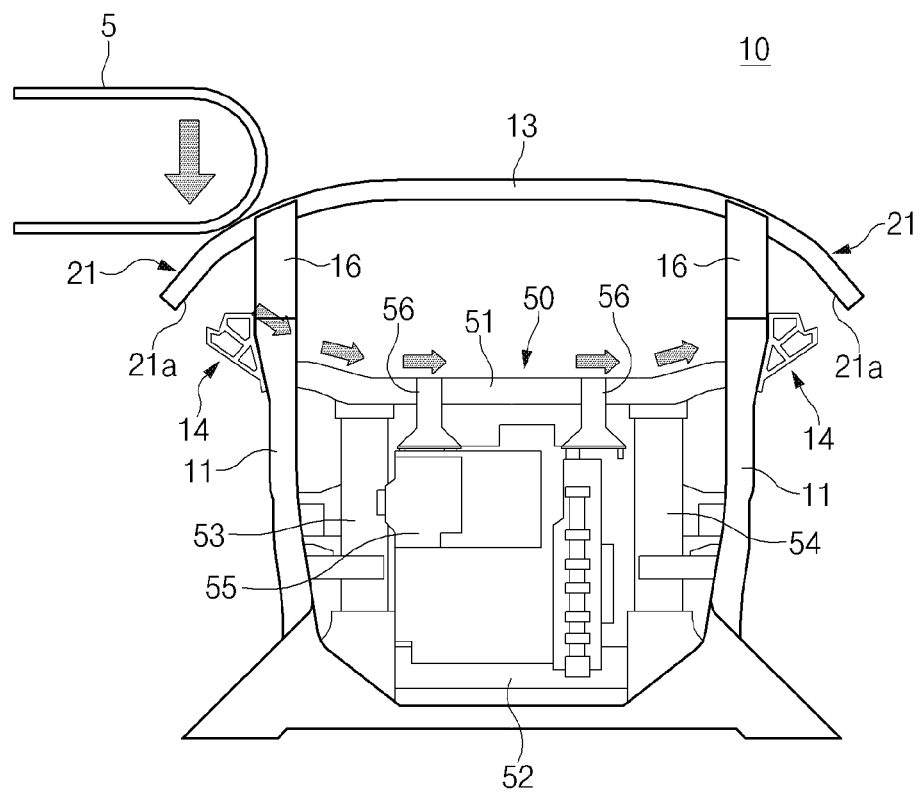
FIG. 3 illustrates a front end structure for a vehicle according to an exemplary form of the present disclosure.
Figure 4:
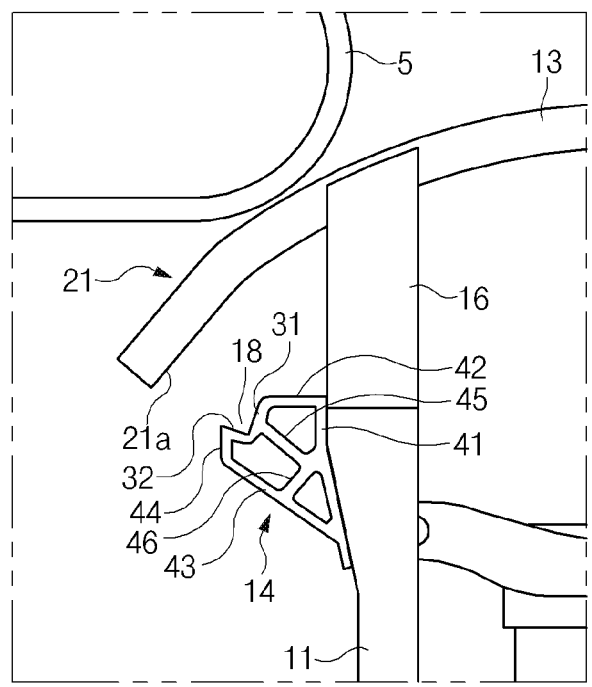
FIG. 4 illustrates an enlarged view of a bumper beam extension and a catching member in a front end structure for a vehicle according to an exemplary form of the present disclosure.
Figure 5:
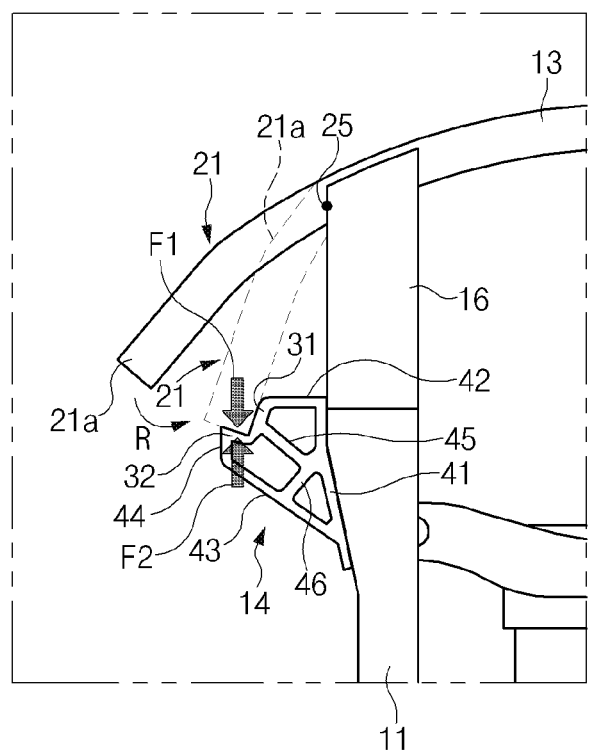
FIG. 5 illustrates a state in which the bumper beam extension is deformed and received in a catching recess of the catching member in the front end structure illustrated in FIG. 4.

Referring to FIGS. 3 to 5, a front end structure 10 for a vehicle according to an exemplary form of the present disclosure may include: a pair of front side members 11, a front bumper beam 13 located in front of the pair of front side members 11, a pair of bumper beam extensions 21 extending from both ends of the front bumper beam 13 toward both sides of the vehicle, and a pair of catching members 14 located behind the pair of bumper beam extensions 21.

Each front side member 11 may extend in a longitudinal direction of the vehicle, and the pair of front side members 11 may be spaced apart from each other in a width direction of the vehicle.

A front bumper assembly may be connected to the front of the pair of front side members 11. The front bumper assembly may include a bumper cover and the front bumper beam 13 connected to the bumper cover.

The front bumper beam 13 may be connected to the pair of front side members 11 through a pair of crash boxes 16. A front end of each crash box 16 and the front bumper beam 13 may be joined by welding, using fasteners, and/or the like, and a rear end of each crash box 16 and the front portion of the front side member 11 may be joined by welding, using fasteners, and/or the like. In particular, a longitudinal axis of the crash box 16 may be aligned with a longitudinal axis of the corresponding front side member 11, and thus the crash box 16 and the corresponding front side member 11 may extend from the front bumper beam 13 toward the rear of the vehicle in the longitudinal direction of the vehicle.

Each bumper beam extension 21 may extend from each end of the front bumper beam 13 toward the side of the vehicle, and the bumper beam extension 21 may be curved toward the rear of the vehicle. In particular, the bumper beam extension 21 may be curved toward the rear of the vehicle so that a free end 21a thereof may face the front side member 11 and/or the catching member 14.

The pair of catching members 14 may be disposed behind the pair of bumper beam extensions 21, respectively. Specifically, the pair of catching members 14 may be spaced apart from the pair of bumper beam extensions 21 toward the rear of the vehicle. Each catching member 14 may be attached (fixed) to the corresponding front side member 11 and/or the corresponding crash box 16. For example, the catching member 14 may be attached to the front portion of the front side member 11 or the rear portion of the crash box 16. As another example, the catching member 14 may be attached to a joint portion of the front side member 11 and the crash box 16 as illustrated in FIGS. 3 to 6, and thus the catching member 14 may be attached to both the front portion of the front side member 11 and the rear portion of the crash box 16. Each catching member 14 may protrude from the corresponding front side member 11 and/or the corresponding crash box 16 toward the exterior of the vehicle. In particular, the catching member 14 may protrude from the corresponding front side member 11 and/or the corresponding crash box 16 toward the bumper beam extension 21.

The catching member 14 may have a catching recess 18 which is open to the free end 21a of the bumper beam extension 21. When the bumper beam extension 21 is deformed toward the front side member 11, the catching recess 18 may catch the free end 21a of the bumper beam extension 21. In a small overlap impact, when the bumper beam extension 21 is deformed toward the front side member 11, the free end 21a of the bumper beam extension 21 may be received in the catching recess 18 so that the free end 21a of the bumper beam extension 21 may be caught by the catching member 14. In particular, the catching recess 18 may have a shape corresponding to that of the free end 21a of the bumper beam extension 21.

The catching member 14 may include a first catching wall 31 and a second catching wall 32 which define the catching recess 18. The first catching wall 31 may face the side of the vehicle, and the second catching wall 32 may face the front of the vehicle. The first catching wall 31 may be substantially parallel to the axis of the front side member 11 (or the longitudinal axis of the vehicle), and the second catching wall 32 may be substantially parallel to a width axis of the vehicle. The second catching wall 32 may be substantially perpendicular to the first catching wall 31. As the free end 21a of the bumper beam extension 21 contacts the first catching wall 31 and the second catching wall 32, the free end 21a of the bumper beam extension 21 may be caught by the catching recess 18.

In the small overlap impact, the bumper beam extension 21 may rotate toward the front side member 11. As the free end 21a of the bumper beam extension 21 is received in the catching recess 18, the free end 21a of the bumper beam extension 21 may contact the first catching wall 31 and the second catching wall 32, and thus the bumper beam extension 21 may be caught or regulated by the catching recess 18. Specifically, when a rigid barrier 5 strikes a front surface of the bumper beam extension 21, the bumper beam extension 21 may be deformed to rotate around a pivot point 25 (see a direction indicated by arrow R in FIG. 5), and the pivot point 25 may be located at a joint portion between the bumper beam extension 21 and the crash box 16. When the bumper beam extension 21 rotates (is deformed) toward the front side member 11 as indicated by a dotted line in FIG. 5, the free end 21a of the bumper beam extension 21 may come into contact with the first catching wall 31, and thus the rotation of the bumper beam extension 21 may be suppressed by the first catching wall 31, and the free end 21a of the bumper beam extension 21 may come into contact with the second catching wall 32, and thus a load F1 applied by the rigid barrier 5 may act on the second catching wall 32, and a contact reaction force F2 may act on the free end 21a of the bumper beam extension 21 by the second catching wall 32.

According to an exemplary form, the catching member 14 may include an attachment wall 41 attached (fixed) to the front side member 11 and/or the crash box 16, a front support wall 42 extending from a front end of the attachment wall 41 toward the side of the vehicle, a rear support wall 43 extending from a rear end of the attachment wall 41 toward the side of the vehicle, and a sidewall 44 extending from the rear support wall 43 toward the front of the vehicle.

For example, the attachment wall 41 may be directly attached (fixed) to an outboard side surface of the front portion of the front side member 11 or an outboard side surface of the rear portion of the crash box 16 using fasteners, welding, and/or the like. Here, the term "outboard side" refers to a direction toward the exterior space of the vehicle. As another example, the attachment wall 41 may be attached (fixed) to the outboard side surface of the front portion of the front side member 11 and the outboard side surface of the rear portion of the crash box 16 using fasteners, welding, and/or the like. In particular, the attachment wall 41 may have a shape corresponding to that of the outboard side surface of the front portion of the front side member 11 and/or that of the outboard side surface of the rear portion of the crash box 16, and thus the attachment wall 41 may tightly contact the outboard side surface of the front portion of the front side member 11 and/or the outboard side surface of the rear portion of the crash box 16.

The front support wall 42 may extend horizontally from the front end of the attachment wall 41 toward the side of the vehicle, and an axis of the front support wall 42 may be perpendicular to the axis of the front side member 11. That is, the axis of the front support wall 42 may be parallel to the width axis of the vehicle. Specifically, the front support wall 42 may connect the front end of the attachment wall 41 and a front end of the first catching wall 31.

The rear support wall 43 may extend obliquely from the rear end of the attachment wall 41 at a predetermined angle, and an axis of the rear support wall 43 may be inclined with respect to the longitudinal axis of the vehicle at a predetermined angle. The rear support wall 43 may be inclined from the rear end of the attachment wall 41 toward the front of the vehicle at a predetermined angle. Specifically, the rear support wall 43 may connect the rear end of the attachment wall 41 and a rear end of the sidewall 44.

The sidewall 44 may extend from the rear support wall 43 toward the front of the vehicle. Specifically, the sidewall 44 may extend in the longitudinal direction of the vehicle, and an axis of the sidewall 44 may be perpendicular to the axis of the front support wall 42. Specifically, the sidewall 44 may connect a front end of the rear support wall 43 and the second catching wall 32.

The catching member 14 may further include a plurality of reinforcing ribs 45 and 46 increasing stiffness. The plurality of reinforcing ribs 45 and 46 may be disposed in an inner cavity of the catching member 14. The plurality of reinforcing ribs 45 and 46 may include a first reinforcing rib 45 connecting the attachment wall 41 and the first catching wall 31, and a second reinforcing rib 46 connecting the attachment wall 41 and the rear support wall 43.

The first reinforcing rib 45 may be inclined at a predetermined angle to connect the attachment wall 41 and the first catching wall 31, and the second reinforcing rib 46 may be inclined at a predetermined angle to connect the attachment wall 41 and the rear support wall 43.

A front subframe 50 may be disposed between the pair of front side members 11, and the front subframe 50 may support an electric motor (or electric engine) 55, power electronics, a transmission, a suspension, and the like.

The front subframe 50 may include a front crossmember 51 facing the front of the vehicle, a rear crossmember 52 spaced apart from the front crossmember 51 toward the rear of the vehicle, and a pair of side portions 53 and 54 disposed between the front crossmember 51 and the rear crossmember 52. The front crossmember 51 and the rear crossmember 52 may extend in the width direction of the vehicle, and a longitudinal axis of the front crossmember 51 and a longitudinal axis of the rear crossmember 52 may be parallel to the width direction of the vehicle.

A front portion of the electric motor 55 may be connected to the front crossmember 51 through a plurality of mounting brackets 56.

End portions of the front crossmember 51 may be mounted to the front portions of the corresponding front side members 11, respectively, and the front crossmember 51 may extend in the width direction of the vehicle. Thus, the front crossmember 51 may define a load path through which a load is transferred in the width direction of the vehicle, and the load path may extend in a longitudinal direction of the front crossmember 51.

The front crossmember 51 may be located between the pair of catching members 14, and each end portion of the front crossmember 51 may be mounted to the front portion of the front side member 11 using fasteners, welding, elastic bushing, and/or the like. As the catching members 14 are attached to the corresponding front side members 11 and/or the corresponding crash boxes 16, the catching members 14 may face the corresponding end portions of the front crossmember 51, and thus the pair of catching members 14 and the front crossmember 51 may define the load path extending in the width direction of the vehicle. In particular, each end portion of the front crossmember 51 may be disposed to face the corresponding catching member 14 through the corresponding front side member 11 and/or the corresponding crash box 16. Specifically, the left end portion of the front crossmember 51 may be mounted to the front portion of the left front side member 11 through left elastic bushing, and/or the like, and the left catching member 14 may be attached (fixed) to the front portion of the left front side member 11 and/or the rear portion of the left crash box 16 so that the front portion of the left front side member 11 and/or the rear portion of the left crash box 16 may be interposed between the left catching member 14 and the left end portion of the front crossmember 51. Thus, the left catching member 14 may be connected to the left end portion of the front crossmember 51 through the left front side member 11 and/or the left crash box 16. The right end portion of the front crossmember 51 may be mounted to the front portion of the right front side member 11 through right elastic bushing, and/or the like, and the right catching member 14 may be attached (fixed) to the front portion of the right front side member 11 and/or the rear portion of the right crash box 16 so that the front portion of the right front side member 11 and/or the rear portion of the right crash box 16 may be interposed between the right catching member 14 and the right end portion of the front crossmember 51. Thus, the right catching member 14 may be connected to the right end portion of the front crossmember 51 through the right front side member 11 and/or the right crash box 16.

Referring to FIG. 3, in a small overlap test, a lateral load generated due to an impact with the barrier 5 may be transferred in the width direction of the vehicle through the bumper beam extension 21, the catching member 14, and the front crossmember 51, and thus the rotation of the vehicle may be suppressed, while the lateral behavior of the vehicle may be induced.

Figure 6:
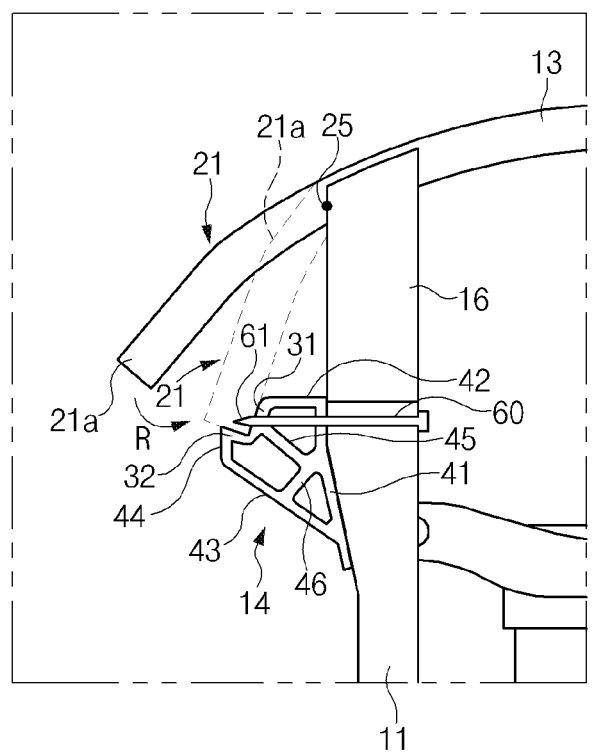
FIG. 6 illustrates a front end structure for a vehicle according to another exemplary form of the present disclosure.

FIG. 6 illustrates a front end structure for a vehicle according to another exemplary form of the present disclosure. Referring to FIG. 6, the front end structure 10 for a vehicle may further include a joint pin 60 penetrating the front portion of the front side member 11 and the catching member 14. The joint pin 60 may extend in the width direction of the vehicle, and the joint pin 60 may have a sharp end portion 61. The end portion 61 of the joint pin 60 may pass through the first catching wall 31 of the catching member 14 and be located in the catching recess 18. That is, the end portion 61 may protrude from the first catching wall 31 of the catching member 14 toward the free end 21a of the bumper beam extension 21. As the bumper beam extension 21 is deformed, and the free end 21a is received in the catching recess 18 of the catching member 14, the free end 21a may be joined to the end portion 61 of the joint pin 60, and thus the deformed free end 21a of the bumper beam extension 21 may be more firmly joined to the catching member 14.

According to the above-described exemplary forms of the present disclosure, the catching member 14 may protrude from the front side member 11 so as to be adjacent to the bumper beam extension 21. In the small overlap test, when the barrier 5 impacts the front end of the vehicle, the bumper beam extension 21 may be deformed to contact the catching member 14, and the bumper beam extension 21 and the front side member 11 may be directly connected, and thus a triangular, continuous load path may be defined between the bumper beam extension 21, the catching member 14, and the front side member 11. The front crossmember 51 of the front subframe 50 may define the load path in the width direction of the vehicle, and each end portion of the front crossmember 51 may be connected to the catching member 14 through the front portion of the front side member 11 so that the lateral load may be applied in the width direction of the vehicle. Thus, in the small overlap frontal impact, the lateral behavior of the vehicle may be induced. As set forth above, in the small overlap frontal impact, the front end structure for a vehicle according to the exemplary forms of the present disclosure may suppress the rotation of the vehicle, and induce the lateral behavior of the vehicle using the bumper beam extension 21, the catching member 14, and the front crossmember 51 of the front subframe 50, thereby improving the safety of occupants in an eco-friendly vehicle such as a battery electric vehicle (BEV) and a fuel cell electric vehicle (FCEV).

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A front end structure for a vehicle, the front end structure comprising:
    a pair of front side members;
    a front bumper beam located in front of the pair of front side members;
    a pair of bumper beam extensions respectively extending from both ends of the front bumper beam toward both sides of the vehicle;
    a pair of catching members spaced apart from the pair of bumper beam extensions toward a rear of the vehicle, respectively; and
    a joint pin penetrating a corresponding front side member among the pair of front side members, wherein the joint pin connects the corresponding front side member and a corresponding catching member among the pair of catching members, wherein the joint pin has an end portion protruding toward a free end of a bumper beam extension among the bumper beam extensions
    wherein bumper beam extensions of the pair of bumper beam extensions are respectively curved toward catching members of the pair of catching members.

2. The front end structure according to claim 1, wherein a catching member among the catching members is attached to an outboard side surface of a front portion of a corresponding front side member of the pair of front side members so as to be adjacent to a bumper beam extension among the bumper beam extensions.

3. The front end structure according to claim 1, wherein a catching member among the catching members has a catching recess which is open to a free end of a corresponding bumper beam extension among the bumper beam extensions, and
    the catching recess has a shape compatible with a shape of the free end of the corresponding bumper beam extension.

4. The front end structure according to claim 3, wherein the catching member includes a first catching wall and a second catching wall, which define the catching recess,
    the first catching wall faces a side of the vehicle, and
    the second catching wall faces a front of the vehicle.

5. The front end structure according to claim 4, wherein the first catching wall is substantially parallel to an axis of the pair of front side members, and
    the second catching wall is substantially perpendicular to the first catching wall.

6. The front end structure according to claim 5, wherein the catching member includes:
    an attachment wall attached to a corresponding front side member of the pair of front side members,
    a front support wall extending from a front end of the attachment wall toward the side of the vehicle,
    a rear support wall extending from a rear end of the attachment wall toward the side of the vehicle, and
    a sidewall extending from the rear support wall toward the front of the vehicle.

7. The front end structure according to claim 6, wherein the front support wall connects the front end of the attachment wall and a front end of the first catching wall,
    the rear support wall connects the rear end of the attachment wall and a rear end of the sidewall, and
    the sidewall connects a front end of the rear support wall and the second catching wall.

8. The front end structure according to claim 6, wherein the catching member further includes:
    a first reinforcing rib connecting the attachment wall and the first catching wall, and
    a second reinforcing rib connecting the attachment wall and the rear support wall.

9. The front end structure according to claim 1, further comprising a front subframe disposed between the pair of front side members,
    wherein the front subframe includes a front crossmember extending in a width direction of the vehicle, and
    the pair of catching members is configured to extend a load path to the front crossmember.

* * * * *